United States Patent
Yoshida

(10) Patent No.: US 10,158,526 B2
(45) Date of Patent: Dec. 18, 2018

(54) SYSTEM THAT MANAGES SERVER FUNCTION

(71) Applicant: NEC Corporation, Tokyo (JP)

(72) Inventor: Ryoji Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 15/080,046

(22) Filed: Mar. 24, 2016

(65) Prior Publication Data
US 2016/0285725 A1    Sep. 29, 2016

(30) Foreign Application Priority Data

Mar. 27, 2015  (JP) ................................. 2015-066548
Mar. 27, 2015  (JP) ................................. 2015-066549

(51) Int. Cl.
G06F 17/30   (2006.01)
H04L 29/08   (2006.01)
H04L 12/24   (2006.01)
H04L 12/26   (2006.01)

(52) U.S. Cl.
CPC ...... H04L 41/0813 (2013.01); H04L 41/0833 (2013.01); H04L 43/0817 (2013.01)

(58) Field of Classification Search
CPC ........... G06F 15/17331; G06F 11/2025; H04L 29/08; H04L 41/0813; H04L 41/0833; H04L 43/0817
USPC ........ 707/634, 770; 709/201, 203, 204, 213, 709/214, 226
See application file for complete search history.

(56) References Cited

U.S. PATENT DOCUMENTS

| | | | | |
|---|---|---|---|---|
| 5,758,077 A * | 5/1998 | Danahy | ................. | G06F 9/5055 709/201 |
| 6,128,644 A * | 10/2000 | Nozaki | .................... | G06F 9/505 709/201 |
| 6,202,170 B1 * | 3/2001 | Busschbach | ............. | H04Q 1/24 370/219 |
| 7,024,451 B2 * | 4/2006 | Jorgenson | ............... | H04L 29/06 709/203 |
| 7,097,047 B2 * | 8/2006 | Lee | ...................... | H05K 7/1449 211/26.2 |
| 7,173,821 B2 * | 2/2007 | Coglitore | ................ | G06F 1/189 307/65 |

(Continued)

FOREIGN PATENT DOCUMENTS

JP    08-016531 A    1/1996
JP    2005-339528 A    12/2005

(Continued)

OTHER PUBLICATIONS

Japanese Office Action issued in corresponding Japanese Patent Application No. 2015-066548, dated Jan. 10, 2017, 14 pages.

(Continued)

Primary Examiner — Frantz Coby
(74) Attorney, Agent, or Firm — Wilmer Cutler Pickering Hale and Dorr LLP

(57) ABSTRACT

A system of the present invention includes a plurality of servers 111 and 112. Each of the servers is configured to operate as a given function of a plurality of functions as which the server can operate. The system includes: a detection unit 151 detecting the operation status of the server, and a management unit 152 determining change of a function as which the server operates depending on the operation status.

20 Claims, 12 Drawing Sheets

(56) References Cited

U.S. PATENT DOCUMENTS

| | | | | |
|---|---|---|---|---|
| 7,240,234 | B2* | 7/2007 | Morita | G06F 11/2025 710/36 |
| 7,289,334 | B2* | 10/2007 | Behrens | G06F 1/18 361/752 |
| 7,990,847 | B1* | 8/2011 | Leroy | H04L 43/0817 370/216 |
| 8,359,388 | B2* | 1/2013 | Cui | H04L 47/70 709/203 |
| 9,665,521 | B2* | 5/2017 | Hormuth | G06F 15/17331 |
| 9,804,937 | B2* | 10/2017 | Huang | G06F 11/2025 |
| 2003/0177487 | A1* | 9/2003 | Chyan | G06F 8/63 717/174 |
| 2003/0236888 | A1* | 12/2003 | Chauffour | H04L 29/06 709/226 |
| 2009/0119523 | A1* | 5/2009 | Totten | G06F 1/26 713/322 |
| 2010/0293491 | A1* | 11/2010 | Kawai | G03G 15/5075 715/771 |
| 2013/0339714 | A1* | 12/2013 | Hormuth | G06F 15/17331 713/2 |
| 2014/0310415 | A1* | 10/2014 | Kirner | H04L 41/082 709/225 |

FOREIGN PATENT DOCUMENTS

| | | |
|---|---|---|
| JP | 2009-118728 A | 5/2009 |
| JP | 2010-287256 A | 12/2010 |
| JP | 2011-001822 A | 1/2011 |
| JP | 2011-013822 A | 1/2011 |
| JP | 2011-076158 A | 4/2011 |
| JP | 2013-101576 A | 5/2013 |
| JP | 2014-229253 A | 12/2014 |
| WO | WO-03-083693 A1 | 10/2003 |
| WO | WO-2012/117453 A1 | 9/2012 |
| WO | WO-2013/084332 A1 | 6/2013 |

OTHER PUBLICATIONS

Japanese Office Action issued by the Japan Patent Office for Application No. 2015-066548 dated May 24, 2016 (14 pages).

Japanese Office Action issued by the Japan Patent Office for Application No. 2015-066549 dated May 24, 2016 (13 pages).

\* cited by examiner

Fig.6

| RACK A | | |
|---|---|---|
| SERVER | PURPOSE | POWER CONSUMPTION (W) |
| SERVER 11 | Web SERVER | 200 |
| SERVER 12 | AP SERVER | 300 |
| SERVER 13 | Mail SERVER | 150 |
| SERVER 14 | Mail SERVER | 150 |
| SERVER 15 | DB SERVER | 200 |
| TOTAL | | 1000 |

| RACK B | | |
|---|---|---|
| SERVER | PURPOSE | POWER CONSUMPTION (W) |
| SERVER 21 | Web SERVER | 200 |
| SERVER 22 | AP SERVER | 200 |
| SERVER 23 | AP SERVER | 200 |
| SERVER 24 | Mail SERVER | 200 |
| SERVER 25 | DB SERVER | 200 |
| TOTAL | | 1000 |

Fig. 7

| RACK A | | |
|---|---|---|
| SERVER | PURPOSE | POWER CONSUMPTION (W) |
| SERVER 11 | Web SERVER | 200 |
| SERVER 12 | AP SERVER | 350 |
| SERVER 13 | Mail SERVER | 50 |
| SERVER 14 | Mail SERVER | 50 |
| SERVER 15 | DB SERVER | 200 |
| TOTAL | | 850 |

| RACK B | | |
|---|---|---|
| SERVER | PURPOSE | POWER CONSUMPTION (W) |
| SERVER 21 | Web SERVER | 200 |
| SERVER 22 | AP SERVER | 350 |
| SERVER 23 | AP SERVER | 350 |
| SERVER 24 | Mail SERVER | 50 |
| SERVER 25 | DB SERVER | 200 |
| TOTAL | | 1150 |

Fig. 8

| RACK A | | | | RACK B | | |
|---|---|---|---|---|---|---|
| SERVER | PURPOSE | POWER CONSUMPTION (W) | | SERVER | PURPOSE | POWER CONSUMPTION (W) |
| SERVER 11 | Web SERVER | 200 | | SERVER 21 | Web SERVER | 200 |
| SERVER 12 | AP SERVER | 210 | | SERVER 22 | AP SERVER | 210 |
| SERVER 13 | AP SERVER | 210 | | SERVER 23 | AP SERVER | 210 |
| SERVER 14 | Mail SERVER | 150 | | SERVER 24 | AP SERVER | 210 |
| SERVER 15 | DB SERVER | 200 | | SERVER 25 | DB SERVER | 200 |
| TOTAL | | 970 | | TOTAL | | 1030 |

Fig. 9

| PATTERN | RACK | PURPOSE | | | | TOTAL OF POWER CONSUMPTION (W) |
|---|---|---|---|---|---|---|
| 1 | a | DB SERVER | DB SERVER | Web SERVER | Mail SERVER | 950 |
|   | b | AP SERVER | AP SERVER | AP SERVER | AP SERVER | 1050 |
| 2 | a | DB SERVER | DB SERVER | Web SERVER | AP SERVER | 1010 |
|   | b | AP SERVER | AP SERVER | AP SERVER | Mail SERVER | 990 |
| 3 | a | DB SERVER | DB SERVER | Web SERVER | AP SERVER | 960 |
|   | b | AP SERVER | AP SERVER | AP SERVER | Web SERVER | 1040 |
| 4 | a | DB SERVER | Web SERVER | Mail SERVER | AP SERVER | 960 |
|   | b | AP SERVER | AP SERVER | AP SERVER | DB SERVER | 1040 |
| 5 | a | Web SERVER | Web SERVER | Mail SERVER | AP SERVER | 970 |
|   | b | AP SERVER | AP SERVER | AP SERVER | DB SERVER | 1030 |
| 6 | a | DB SERVER | Web SERVER | Mail SERVER | DB SERVER | 970 |
|   | b | AP SERVER | AP SERVER | AP SERVER | AP SERVER | 1030 |
| 7 | a | DB SERVER | AP SERVER | Web SERVER | Mail SERVER | 1020 |
|   | b | AP SERVER | AP SERVER | Mail SERVER | AP SERVER | 980 |
| 8 | a | DB SERVER | DB SERVER | Mail SERVER | AP SERVER | 970 |
|   | b | AP SERVER | AP SERVER | AP SERVER | Web SERVER | 1030 |
| 9 | a | DB SERVER | DB SERVER | Web SERVER | AP SERVER | 1020 |
|   | b | AP SERVER | AP SERVER | AP SERVER | Mail SERVER | 980 |

Fig.10

RACK A

| SERVER | PURPOSE | POWER CONSUMPTION (W) |
|---|---|---|
| SERVER 11 | Web SERVER | 200 |
| SERVER 12 | Web SERVER | 200 |
| SERVER 13 | AP SERVER | 210 |
| SERVER 14 | DB SERVER | 200 |
| SERVER 15 | DB SERVER | 200 |
| TOTAL | | 1010 |

RACK B

| SERVER | PURPOSE | POWER CONSUMPTION (W) |
|---|---|---|
| SERVER 21 | Mail SERVER | 210 |
| SERVER 22 | AP SERVER | 210 |
| SERVER 23 | AP SERVER | 210 |
| SERVER 24 | AP SERVER | 150 |
| SERVER 25 | AP SERVER | 210 |
| TOTAL | | 990 |

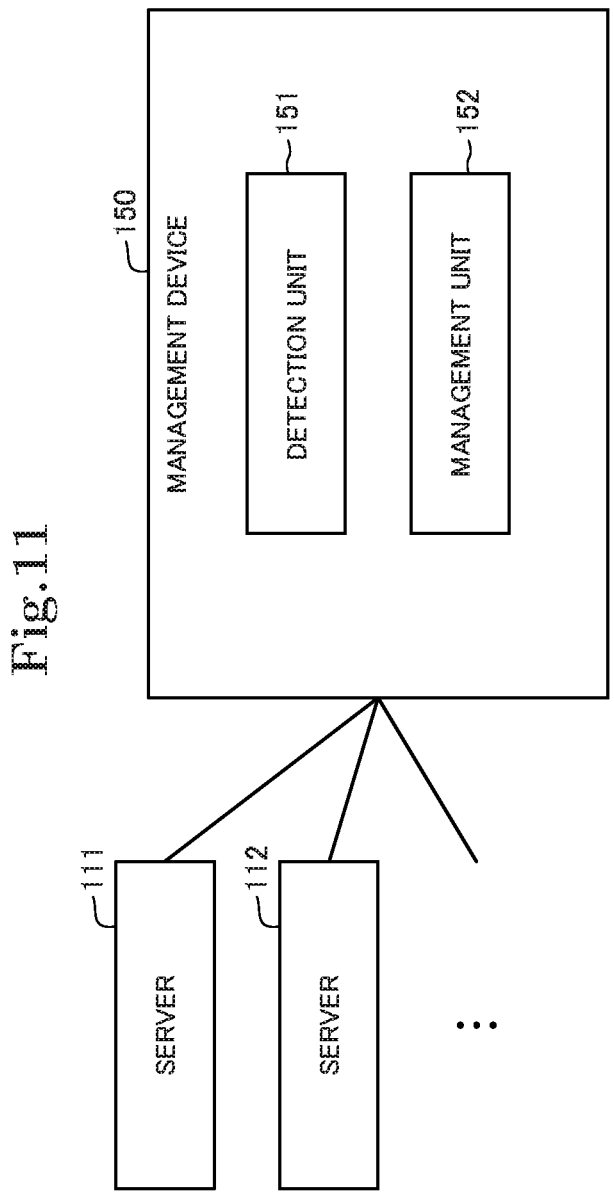

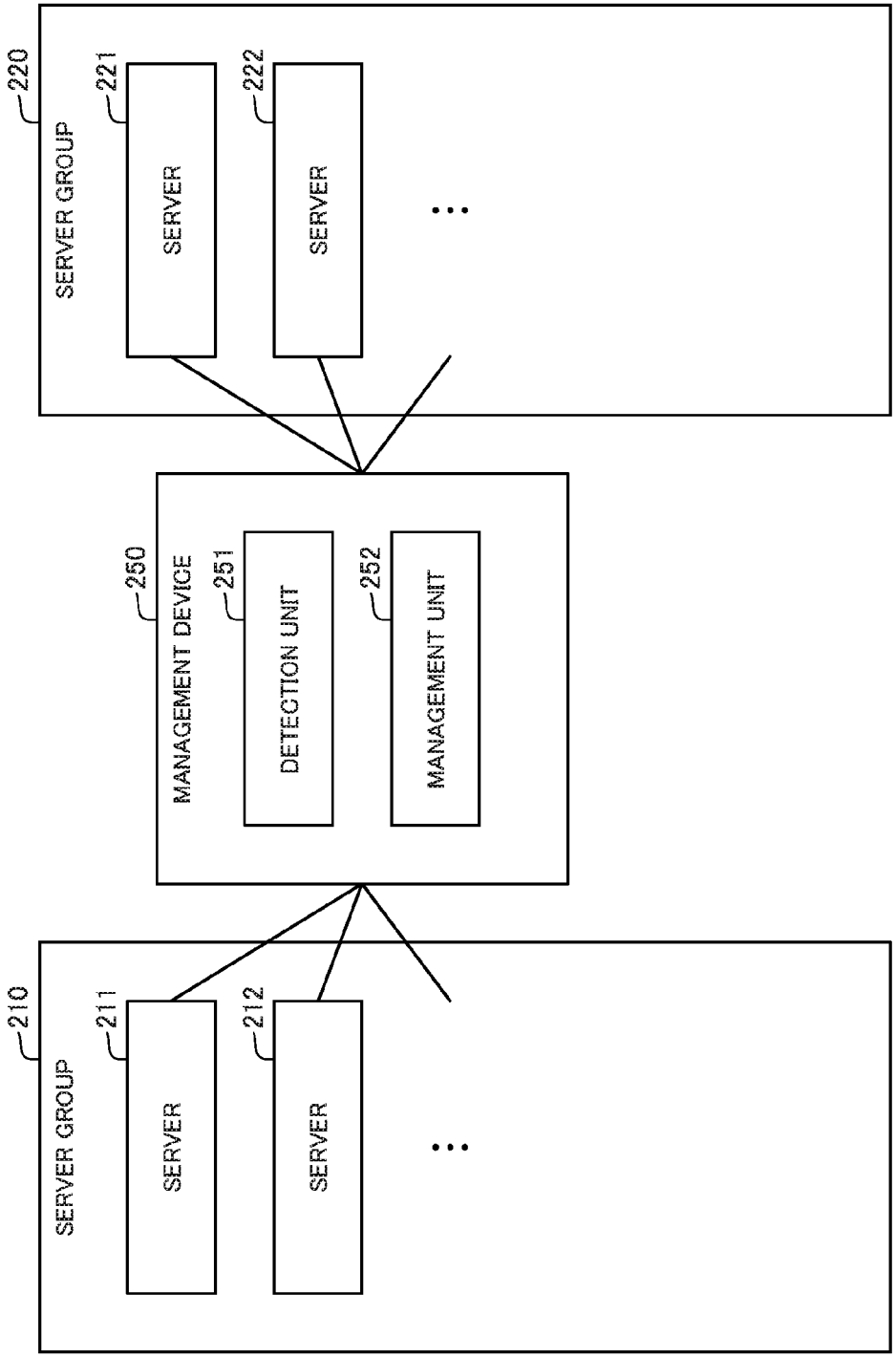

SYSTEM THAT MANAGES SERVER FUNCTION

INCORPORATION BY REFERENCE

This application is based upon and claims the benefit of priority from Japanese patent application No. 2015-066549, filed on Mar. 27, 2015, and Japanese patent application No. 2015-066548, filed on Mar. 27, 2015, the disclosures of which are incorporated herein in its entirety by reference.

TECHNICAL FIELD

The present invention relates to a system, more specifically, relates to a system which includes a plurality of servers. Further, the present invention relates to a management device, a program, and a management method.

BACKGROUND ART

A rack system (a system) managing a plurality of servers installed in one rack is known. In recent years, the number of servers which can be installed in one rack has been increasing with server densification.

Regarding such a rack system, in view of the cooling efficiency of servers and a power supply facility within a rack, the upper limit of electric energy which can be used by one rack may be set (for example, see Patent Document 1).
Patent Document 1: Japanese Unexamined Patent Application Publication No. JP-A 2009-118728

A server can operate as a specific function such as a web server, a mail server, an application server and a database server. For example, a server is equipped with a plurality of operating systems (OS) which run the respective functions, and the server changes and initiates the OS, thereby realizing operation as a specific function. With such a configuration, a plurality of servers installed in one rack or a plurality of racks do not always operate as the same function, and may operate as different functions. Consequently, load and power consumption vary among servers in one rack depending on a time. Moreover, load and power consumption vary among racks depending on a time. Thus, a problem of increase of heat generation and power consumption in the entire rack and also a problem of inability to efficiently use resources occur. As a result, a problem of instability of the operation status and performance degradation occurs.

SUMMARY OF THE INVENTION

Accordingly, an object of the present invention is to solve the abovementioned problem, namely, the problem of instability of the operation status and performance degradation in a system including a plurality of servers.

A system as an aspect of the present invention is a system including a plurality of servers each configured to operate as a given function of a plurality of functions as which the server can operate.

The system includes a microprocessor including:
a detection unit detecting an operation status of the server; and
a management unit determining change of a function as which the server operates depending on the operation status.

Further, a management device as another aspect of the present invention is a management device connected to a system including a plurality of servers each configured to operate as a given function of a plurality of functions as which the server can operate.

The management device includes a microprocessor including:
a detection unit detecting an operation status of the server; and
a management unit determining change of a function as which the server operates depending on the operation status.

Further, a program as another aspect of the present invention includes instructions for causing a management device connected to a system including a plurality of servers each configured to operate as a given function of a plurality of functions as which the server can operate, to realize:
a detection unit detecting an operation status of the server; and
a management unit determining change of a function as which the server operates depending on the operation status.

Further, a management method as another aspect of the present invention is a management method by a management device connected to a system including a plurality of servers, each of the servers being configured to operate as a given function of a plurality of functions, the server being able to operate as the functions.

The management method includes:
detecting an operation status of the server; and
determining change of a function as which the server operates depending on the operation status.

Further, a system as another aspect of the present invention is a system having a plurality of server groups each including a plurality of servers.

Each of the servers is configured to operate as a given function of a plurality of functions as which the server can operate.

The system includes a microprocessor including:
a detection unit detecting operation statuses of the servers; and
a management unit determining change in arrangement of the functions between the server groups depending on the operation statuses.

Further, a management device as another aspect of the present invention is a management device connected to a system composed of a plurality of server groups each including a plurality of servers each configured to operate as a given function of a plurality of functions as which the server can operate.

The management device includes a microprocessor including:
a detection unit detecting operation statuses of the servers; and
a management unit determining change in arrangement of the functions between the server groups depending on the operation statuses.

Further, a program as another aspect of the present invention includes instructions for causing a management device connected to a system composed of a plurality of server groups each including a plurality of servers each configured to operate as a given function of a plurality of functions as which the server can operate, to realize:
a detection unit detecting operation statuses of the servers; and
a management unit determining change in arrangement of the functions between the server groups depending on the operation statuses.

Further, a management method as another aspect of the present invention is a management method by a management device connected to a system composed of a plurality of server groups each including a plurality of servers, each of the servers being configured to operate as a given function of a plurality of functions, the server being able to operate as the functions.

The management method includes:
  detecting operation statuses of the servers; and
  determining change in arrangement of the functions between the server groups depending on the operation statuses.

With the configurations as described above, the present invention can stabilize the operations status of a system including a plurality of servers and achieve increase of performance.

BRIEF DESCRIPTION OF DRAWINGS

FIG. 6 is a diagram showing an example of the function and power of each of the servers disclosed in FIG. 1;

FIG. 7 is a diagram showing an example of the function and power of each of the servers disclosed in FIG. 1;

FIG. 8 is a diagram showing an example of change of the function of each of the servers disclosed in FIG. 7;

FIG. 9 is a diagram showing a list of combinations of the functions of the respective servers disclosed in FIG. 8;

FIG. 10 is a diagram showing an example of change of the functions of the respective servers disclosed in FIG. 7;

FIG. 11 is a block diagram showing the configuration of a system in a second exemplary embodiment of the present invention; and FIG. 12 is a block diagram showing the configuration of a system in a third exemplary embodiment of the present invention.

EXEMPLARY EMBODIMENT

First Exemplary Embodiment

Figure 1:
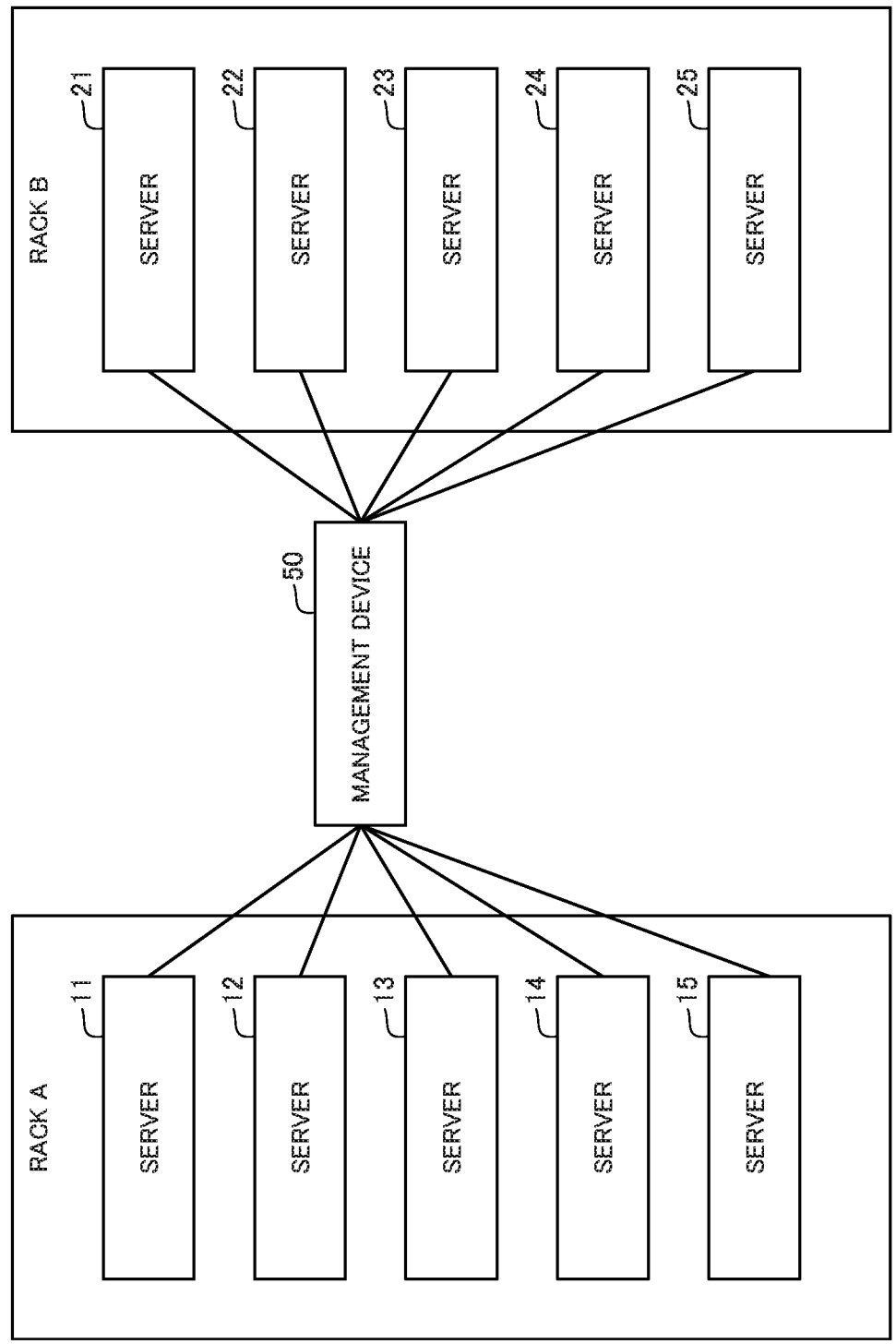
FIG. 1 is a block diagram showing the configuration of a system in a first exemplary embodiment of the present invention.
Figure 2:
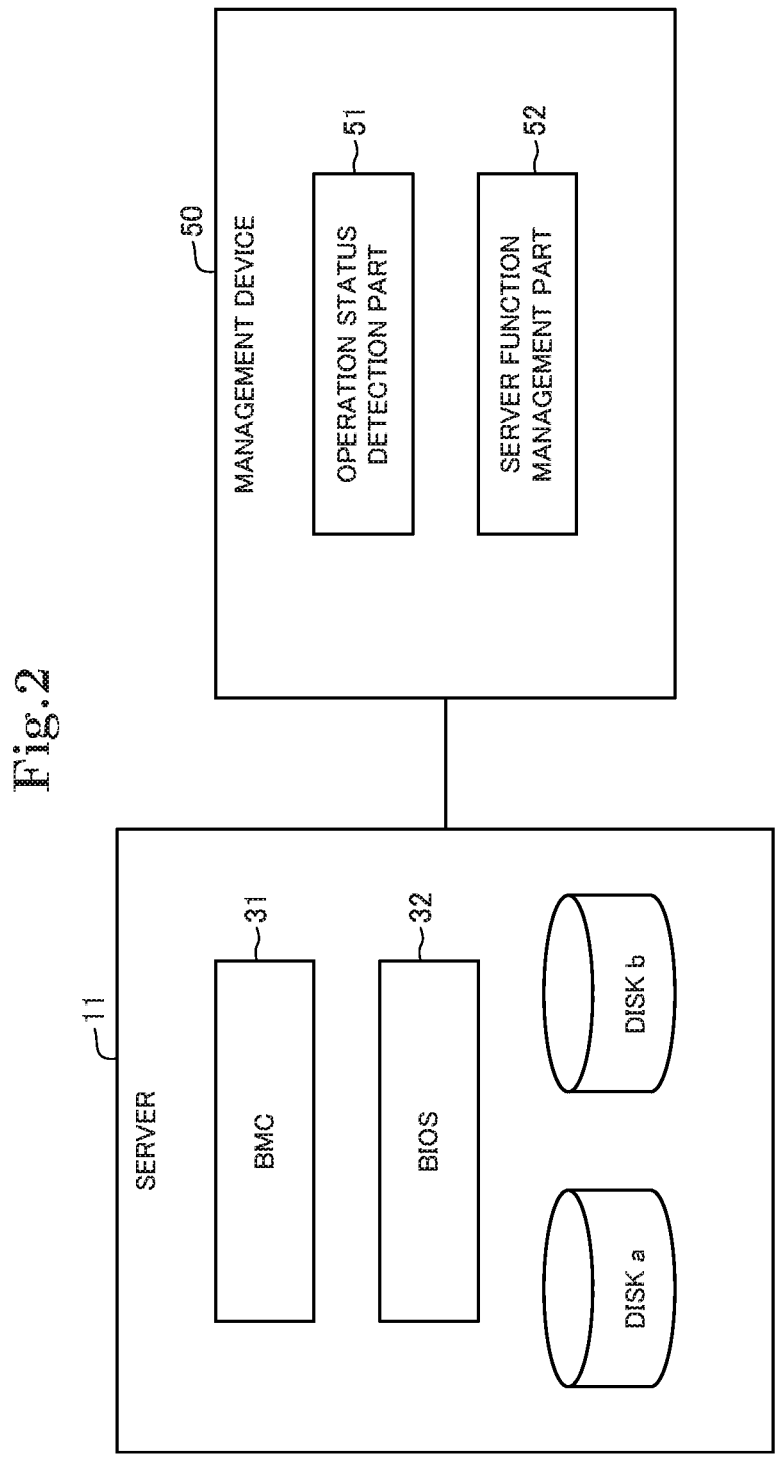
FIG. 2 is a function block diagram showing the configuration of a server and a management device disclosed in FIG. 1.

A first exemplary embodiment of the present invention will be described referring to FIGS. 1 to 10. FIGS. 1 and 2 are diagrams for describing the configuration of a system in the first exemplary embodiment, and FIGS. 3 to 10 are diagrams for describing the operation thereof.

As shown in FIG. 1, the system (an information processing system) in this exemplary embodiment includes two server groups and a management device 50. The server groups are installed in racks A and B, respectively, and each composed of a plurality of servers. For example, in the example shown in FIG. 1, the racks A and B each have a plurality of shelves, and five blade servers 11 to 15 and five blade servers 21 to 25 are installed in the shelves of the respective racks.

Further, although not shown in the drawings, the racks A and B each include a power supply module and a rack manager. The power supply modules supply power to the servers 11 to 15 and the servers 21 to 25, respectively. The rack managers manage the operation of the components installed in the racks, respectively. However, in the system of the present invention, either the number of racks or the number of servers installed in one rack is not limited to those shown in the drawings.

Further, the server groups configuring the system are not limited to being configured as rack servers. For example, the server group may be formed by a tower server, or may be formed by a plurality of server modules installed in one blade. Moreover, the server group configuring the system may be formed by putting a plurality of servers together into a server group. For example, a plurality of servers placed in a certain zone within a data center may be put together into one server group, or a plurality of servers placed for each area may be put together into one server group.

Next, the configurations of the servers 11 to 15 and 21 to 25 will be described referring to FIG. 2. Because the servers 11 to 15 and 21 to 25 have almost the same configuration, the server 11 will be described as an example.

The server 11 is a general information processing device including a BMC (Baseboard Management Controller) 31, a BIOS (Basic Input/Output System) 32, an arithmetic device, namely, a CPU (Central Processing Unit) (not shown in the drawings), and storage devices, namely, disks a and b.

The BMC 31 manages the operation status of the server 11. The BMC 11 is connected to the management device 50 and is capable of communicating with the management device 50. The BMC 31 has a function of, in response to a request from the management device 50, detecting power consumption of the server 11 and notifying it to the management device 50.

The BIOS 32 is executed simultaneously with power-up and executes an OS (Operating System) from the disk a or the disk b selected as where to boot from. Where to boot from is set in the BIOS 32 from the management device 50 via the BMC 31.

In the disk a and the disk b, image data of a plurality of OS corresponding to server functions are stored. The plurality of OS are executed by the CPU of the server 11 so as to cause the server 11 to operate as a specific server function (a specific function) of the server functions such as a web server, a mail server, an application server and a database server. Image data of an OS set in the BIOS 32 is booted from the disk a or the disk b. Execution of the OS causes the server 11 to operate as a given server function among the plurality of server functions which can be executed by the server 11.

Next, the configuration and operation of the management device 50 will be described. The management device 50 is an information processing device which includes an arithmetic device, namely, a CPU (Central Processing Unit) and a storage device. The management device 50 is connected to all the servers 11 to 15 and the servers 21 to 25 installed in the respective racks A and B via a network.

As shown in FIG. 2, the management device 50 includes an operation status detection part 51 (a detection unit) and a server function management part 52 (a management unit), which are built by execution of a program by the CPU.

The operation status detection part 51 has a function of detecting a power consumption value as an operation status value representing the operation status of the server 11. To be specific, the operation status detection part 51 requests the BMC 31 of each of the servers 11 to 15 and 21 to 25 to detect the power consumption value of the server for each preset time. Then, the operation status detection part 51 acquires the power consumption value of the server for each time from the BMC 31 of each of the servers 11 to 15 and 21 to 25, and stores the value into a storage device.

Although a case where the operation status detection part 51 detects the power consumption value of the server as the operation status detection value is described above, the operation status detection part 51 may detect another operation status of the server. For example, the operation status detection part 51 may detect the load, throughput or the like of the server as the operation status detection value.

Figure 3:
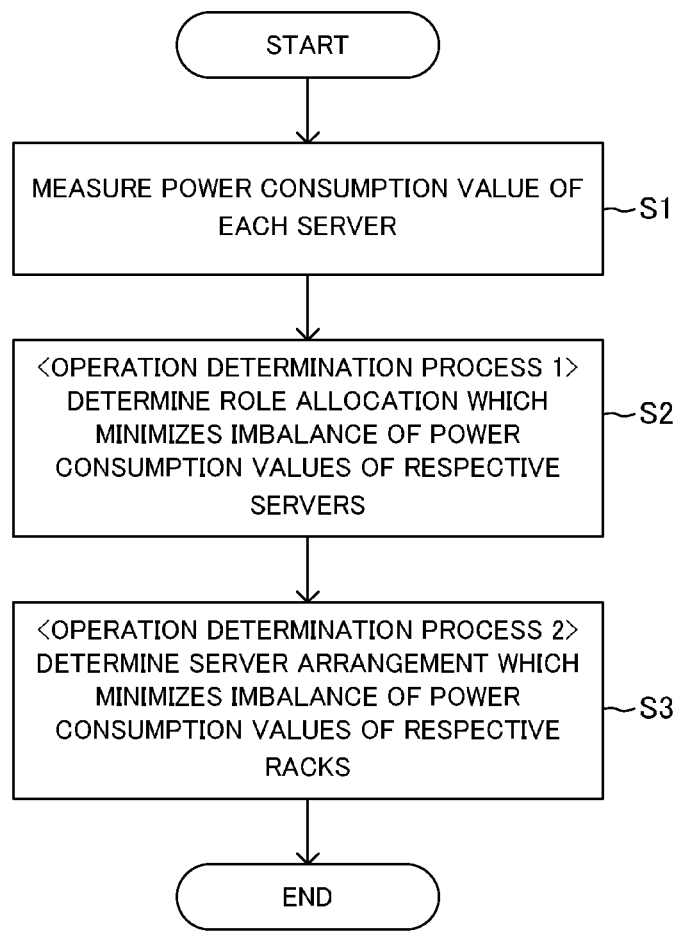
FIG. 3 is a flowchart showing the outline of the operation of the management device disclosed in FIG. 2.

Before operation of the system, the operation status detection part 51 detects the power consumption values of the respective servers for each time in which change of the amount and content of business by the system is predicted through statistics (step S1 of FIG. 3). For example, let us suppose the power consumption values of the respective servers as shown in FIG. 6 are detected in a "time 1" and the power consumption values of the respective servers as shown in FIG. 7 are detected in a "time 2." According to these figures, the usage rate of AP servers (application servers) rises and the usage rate of Mail servers (mail servers) falls in the "time 2" as compared with in the "time 1," and therefore, it is apparent that the power consumption values are unbalanced between the AP servers and the Mail servers. Moreover, accompanying with this, it is apparent that the totals of the power consumption values within the respective racks are unbalanced between the rack A and the rack B.

Then, depending on the power consumption values detected by the operation status detection part 51 and stored in the storage device, the server function management part 52 determines a server operation principle for each time, that is, determines change of the server functions as which the servers operate for each time. The server function management part 52 determines change of the server functions in two stages (operation determination processes 1 and 2) as described below.

First, as the "operation determination process 1," the server function management part 52 determines the server functions as which the respective servers operate so that the imbalance of power consumption values among the servers 11 to 15 and 21 to 25 becomes small, especially, becomes the minimum in this example (step S2 of FIG. 3). An example of the specific processing content of the "operation determination process 1" will be described in detail referring to a flowchart shown in FIG. 4.

Figure 4:
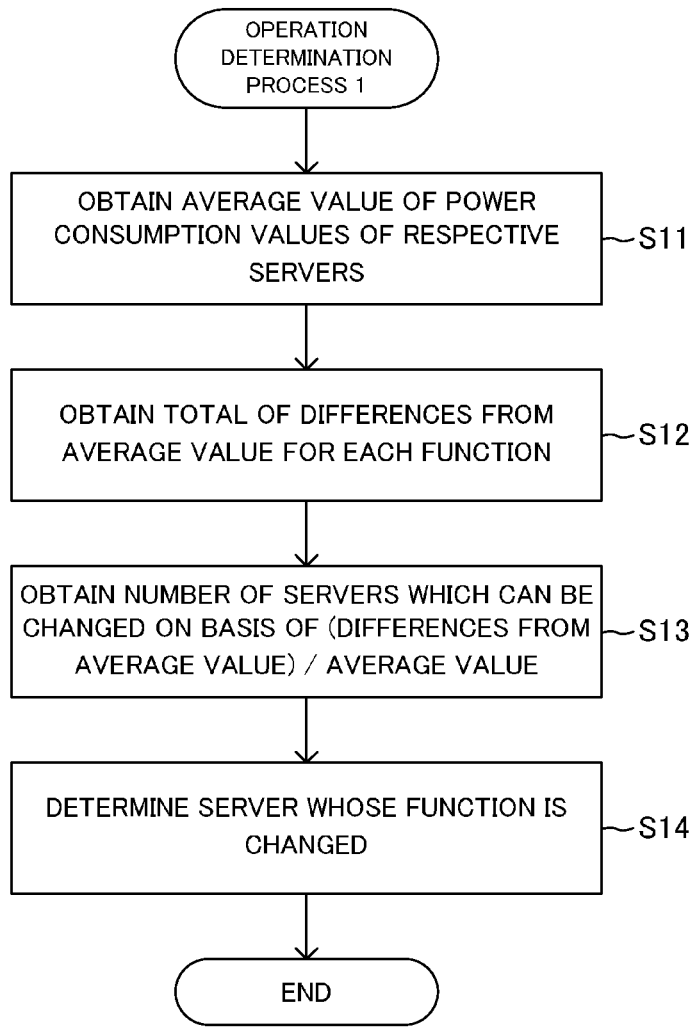
FIG. 4 is a flowchart showing the details of the operation at step S1 of the management device disclosed in FIG. 3.

In the "operation determination process 1," the server function management part 52 first obtains an overall average value (first average value), which is the average value of the power consumption values of all the servers (step S11 of FIG. 4). Herein, the obtained overall average value is 200 W.

Subsequently, for each server function, the server function management part 52 obtains the "total of the differences of the power consumption values from the overall average value" (step S12 of FIG. 4). To be specific, the server function management part 52 obtains, as well as the abovementioned overall average value, a function average value (second average value), a difference value and a product value. A function average value is the average value of the power consumption values for each server function. A difference value is a value obtained by subtracting the overall average value from the function average value for each server function. A product value is a value obtained by multiplying the difference value by the number of the servers for each server function. In other words, for each server function, the server function management part 52 obtains the value of "(the function average value–the overall average value)×(the number of servers for each server function)." In the example shown in FIG. 7, the function average value of the AP servers is 350 W and the function average value of the Mail servers is 50 W, so that the following results are obtained:

the difference between the function average value of the AP servers and the overall average value: (350−200)×3=450(W); and the difference between the function average value of the Mail servers and the overall average value: (50−200)×3=−450(W).

Subsequently, the server function management part 52 divides the abovementioned product value, namely, the "total of the differences between the power consumption values and the overall average value for each server function," by the overall average value (the product value±the overall average value), thereby obtaining the number of the servers whose server functions can be changed (step S13 of FIG. 4). In the example described above, the following result is obtained:

the number of the AP servers changed=450÷200=2; and the number of the Mail servers changed=450÷200= −2.

On the basis of the result of the above calculation, the server function management part 52 determines to change the server functions so as to add two AP servers and delete two Mail servers in the servers installed in the racks A and B (step S14 of FIG. 4). Herein, the server function management part 52 determines to change the server functions of the two servers operating as Mail servers to AP servers as shown by the status in FIG. 7 and shaded part in FIG. 8. Meanwhile, change of server functions is not executed on Web servers (web servers) and DB servers (database servers) because the power consumption values of the respective servers are 200 W, which coincide with the overall average value.

Then, the server function management part 52 sets the operation status of the server functions determined to change in all the racks A and B, in the BIOS 32 of each of the servers. At this time, the server function management part 52 also sets a time to change the server functions in the BIOS 32. For example, as described before, in the "time 2" that the power consumption values are unbalanced among the servers, the server function management part 52 sets a server arrangement for the server functions determined to change in the "operation determination process 1."

As described above, in the "operation determination process 1," change of the server functions as which the respective servers operate is determined, with the result that the power consumption values of the respective servers get close to the overall average value and a difference among the servers becomes small. Thus, it is possible to restrict heat generation and capping of the upper limit of power consumption due to increase of the total of the power consumption values in all the racks A and B. As a result, the operation status in all the racks A and B becomes stable, and performance degradation can be restricted.

The minimum number of servers that need to be reserved may be preset for each server function in all the racks A and B. For example, the minimum number of servers operating as each server function is set to one and, in a case where there is a server operating as a server function whose number becomes zero when change of server functions is determined as stated before, the server function management part 52 determines change so as to reserve one server operating as the server function.

Further, in the above example, the server function management part 52 calculates, for each server function, the number of servers on which change of the server function is executed. However, the server function management part 52 needs not necessarily calculating such a number. For example, depending on the value of a "difference value, which is a value obtained by subtracting the overall average value from the function average value (a function average value–an overall average value)," calculated for each server function, the server function management part 52 may determine a server function on which increase or decrease of the number of servers is executed. To be specific, the server function management part 52 determines server function change so as to increase the number of servers operating as a server function whose difference value is "+" (a positive value), and determines server function change so as to decrease the number of servers operating as a server function whose difference value is "−" (a negative value).

Subsequently, in a server function arrangement status determined to be changed in the "operation determination process 1" described above, the server function management part 52 executes an "operation determination process 2" to be described below, thereby executing a process of determining to change a server function as which each of the servers operates. In this "operation determination process 2," the server function management part 52 determines a server function as which each of the servers operates so that the imbalance of power consumption values between the rack A and the rack B (between the server groups) becomes small, especially, becomes the minimum herein (step S3 of FIG. 3). An example of the specific processing content of this "operation determination process 2" will be described referring to a flowchart of FIG. 5.

In the "operation determination process 2," the server function management part 52 first obtains the power consumption value of each of the servers in the server function arrangement status determined in the "operation determination process 1." The power consumption value of each of the servers may be a value detected by the operation status detection part 51 when the server is actually operated. Alternatively, the power consumption value of each of the servers may be a value which, when change of the server functions is determined in the "operation determination process 1," can be theoretically calculated in the changed status. Herein, let us suppose that the power consumption values of the respective servers are power consumption values actually detected from the respective servers operated in the server function arrangement status determined in the "operation determination process 1" and are values shown in FIG. 8.

Figure 5:
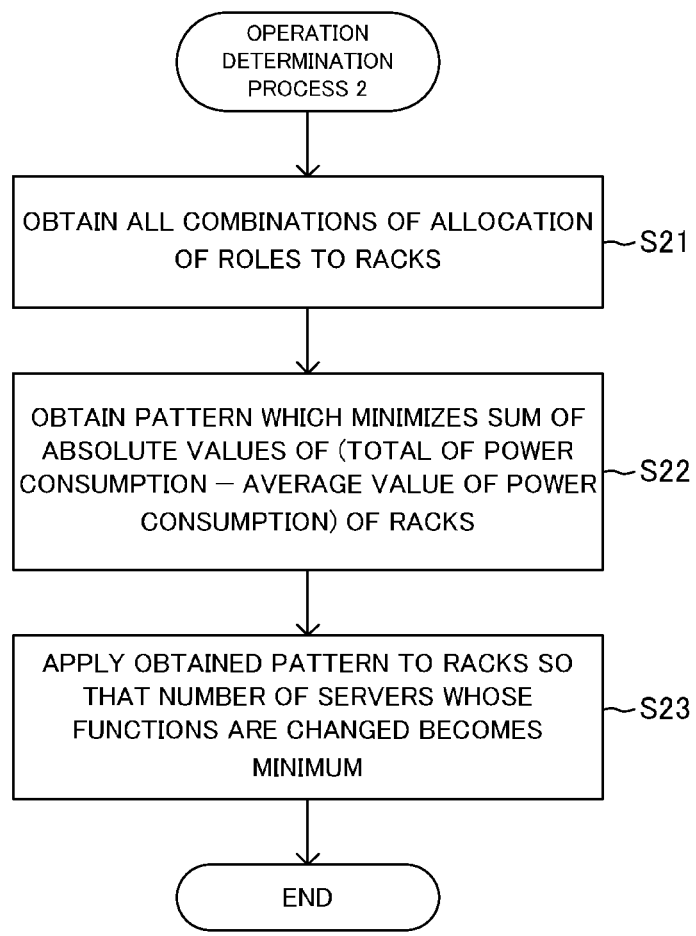
FIG. 5 is a flowchart showing the details of the operation at step S2 of the management device disclosed in FIG. 3.

Subsequently, without changing the number of servers for each server function which operate as the server functions determined in the "operation determination process 1," the server function management part 52 calculates all the arrangement combinations of the servers operating as the respective server functions in the racks A and B (step S21 of FIG. 5). For example, there are nine combination patterns shown in FIG. 9 for arrangement of the servers operating as the respective server functions shown in FIG. 8 (racks a and b).

Then, the server function management part 52 calculates the "absolute value of {(the total of power consumption values)−(the average value of the power consumption values of all the racks)}" for each of the racks in the calculated combinations, and moreover, obtains the "pattern-by-pattern sum" of the absolute values. That is to say, the server function management part 52 obtains the "sum of |(the total of the power consumption values of each of the racks)−(the average value of the power consumption values of all of the racks)|" for each of the patterns. Then, a combination in which the calculated sum is the minimum is watched (step S22 of FIG. 5). In the example of FIG. 9, the second pattern shows the minimum difference in power consumption between the racks, where |1010−1000|+|990−1000|=20.

Subsequently, the server function management part 52 determines to apply the arrangement of the server functions in the pattern showing the minimum difference in power consumption value between the racks found above, to the respective racks A and B (step S23 of FIG. 5). At this moment, the server function management part 52 applies the arrangement of the server functions in the determined pattern to the respective racks A and B so that the number of servers whose server functions need to be changed from the current arrangement of the server functions becomes the minimum. Herein, either in the case of applying the arrangement of the racks (a and b) of the pattern 2 to the actual racks (A and B) or in the case of applying the arrangement to the racks (B and A), the number of servers whose server functions are changed from the arrangement of the server functions shown in FIG. 8 is two for each of the racks. Therefore, either arrangement may be applied. As one example, the server function management part 52 applies the arrangement of the racks (a and b) of the pattern 2 to the actual racks (A and B), and thereby determines to change only the arrangement in the racks shaded in FIG. 10.

Then, the server function management part 52 sets operation of the respective servers in the arrangement of the server functions determined as shown in FIG. 10, in the BIOS 32 of each of the servers. At this time, the server function management part 52 also sets a time to change server functions in the BIOS 32. For example, as stated before, the server function management part 52 sets server arrangement so that the arrangement of the server functions in the "time 2," which is a time when the imbalance of power consumption values among the servers occurs, becomes one determined in the "operation determination process 2."

As described above, in the "operation determination process 2," change of the arrangement of the server functions as which the respective servers operate is determined between the racks, with the result that a difference in power consumption value between the racks becomes small. Thus, it is possible to restrict heat generation and capping of the upper limit of power consumption due to increase of the total of power consumption values in all the racks A and B. Consequently, the operation status of all the racks A and B becomes stable and performance degradation can be restricted.

In the above description, server function arrangement with the minimum difference between the racks A and B is set, and this is effective particularly when the racks have almost the same performance, for example, when the upper limit values of power consumption of the racks are almost the same. However, according to the present invention, arrangement change may be determined depending on the environment, such as racks and areas, in which information processing server groups are formed. For example, in a case where the upper limit of the power consumption value of one rack is high and that of the other is low, arrangement of server functions may be changed between the information processing server groups so that power consumption values do not reach the upper limits of the respective racks.

Further, although a case where a server stores images of OS for operating the respective server functions are previously stored in the disks a and b included by the server is illustrated in the above description, a method of causing a server to operate a server function may be another method. For example, the method may be saving an OS image in an outside environment such as a SAN (Storage Area Network) boot environment, booting image data of an OS set in the BIOS 32 by the management device 50 via the BMC 31 from the outside, and executing the OS. Otherwise, the method may be preparing a plurality of virtual OS on a basic OS executed by a server, initiating a specific virtual OS, and operating a given server function.

Second Exemplary Embodiment

Next, a second exemplary embodiment of the present invention will be described referring to FIG. 11. A system in this exemplary embodiment includes a plurality of servers 111, 112, . . . , and also includes a management device 150 managing these servers.

The server 111 is configured to operate as a given function among a plurality of functions as which the server can operate. For example, as stated before, the server 111 can operate as functions such as a web server, a mail server, an application server and a database server, and operates as a given function among them.

The management device 150 includes a detection unit 151 and a management unit 152, which are built by execution of a program by an arithmetic device. The detection unit 151 detects the operation status of the server 111. The management device 152 determines change of a function as which a server operates depending on the operation status.

In the system with the abovementioned configuration, first, the detection unit 151 of the management device 150 detects the operation status of each of the servers 111, 112. For example, the detection unit 151 detects power consumption of each of the servers 111, 112.

Then, the management unit 152 of the management device 150 determines change of a function as which each of the servers 111, 112 operates depending on the operation statuses of the respective servers 111, 112. For example, the management unit 152 determines to change the functions of the servers 111, 112 so that a difference in power consumption of all the servers 111, 112 of a group connected to the management device 150 becomes small. Then, by setting so that the respective servers 111, 112 operate as the determined functions, the management device 150 can improve the operation statuses of the servers 111, 112 in the whole system. As a result, the operation statuses of information processing servers in the system become stable, and performance degradation can be restricted.

Third Exemplary Embodiment

Next, a third exemplary embodiment of the present invention will be described referring to FIG. 12. A system in this exemplary embodiment includes a plurality of server groups each including a plurality of servers 211, 212, . . . . In the example of FIG. 12, the system includes, other than a server group 210, another server group 220 including servers 221, 222, . . . . Further, the system includes a management device 250 managing the servers included in the server groups 210 and 220.

The server 211 is configured to operate as a given function among a plurality of functions as which the server can operate. For example, as stated before, the server 211 can operate as functions such as a web server, a mail server, an application server and a database server, and operates as a given function among them.

The management device 250 includes a detection unit 251 and a management unit 252, which are built by execution of a program by an arithmetic device. The detection unit 251 detects the operation status of the server 211. The management unit 252 determines change of a function as which a server operates as so as to change the arrangement of the functions between the server groups 210 and 220, depending on the operation statuses.

In the system with the abovementioned configuration, first, the detection unit 251 of the management device 250 detects the operation status of each of the servers 211, 212. For example, the detection unit 251 detects power consumption of each of the servers 211, 212. As an example, let us suppose that the power consumption values as shown in FIG. 8 are detected in a case where the server group 210 corresponds to the rack A and the server group 220 corresponds to the rack B as in FIG. 8.

Then, the management unit 252 of the management device 250 determines change of the arrangement of functions between the server groups 210 and 220 depending on the detected operation statuses of the servers 211, 212, 221, 222. That is to say, the management unit 252 determines change of functions as which the servers 211, 212, 221 and 222 operate. At this time, for example, the management unit 252 determines change of functions as which the servers operate so that the number of changes of functions between the server groups is small. Moreover, for example, the management unit 252 determines change of functions as which the servers operate so that a difference of the operation statuses of the server groups is small between the server groups. Consequently, for example, change of functions as which the respective servers operate is determined so that the arrangement of functions becomes one shown in FIG. 10 from one shown in FIG. 8.

Then, the management device 250 sets so that each of the servers 211, 212, 221 and 222 operates as a determined function. Herein, let us suppose a case of determining to change the arrangement of functions so that a Web server operating in the one server group 210 operates in the other server group 220. In this case, first, the management device 250 changes and sets so that the server 211 operating as a Web server in the one server function 210 operates as another function. Moreover, the management device 250 changes and sets so that the server 221 operating as another function in the other server group 220 operates as a Web server.

Consequently, it is possible to improve the operation statuses of the servers 111, 112 in the whole system. As a result, the operation statuses of the servers in the system become stable and performance degradation can be restricted.

<Supplementary Notes>

The whole or part of the exemplary embodiments disclosed above can be described as the following supplementary notes. The overview of the configurations of a system, a management device, a program and a management method according to the present invention will be described below. However, the present invention is not limited to the following configurations.

(Supplementary Note 1)

A system including a plurality of servers, each of the servers being configured to operate as a given function of a plurality of functions, the server being able to operate as the functions, the system comprising a microprocessor including:

a detection unit detecting an operation status of the server; and a management unit determining change of a function as which the server operates depending on the operation status.

According to the invention, first, the detection unit detects the operation status of each of the servers. Then, the management unit determines change of the function as which the server operates depending on the operation status. Consequently, by causing the server to operate as the function after the change, the server can improve the operation status. As a result, the operation status of the server in the system becomes stable, and performance degradation can be restricted.

(Supplementary Note 2)

The system according to Supplementary Note 1, wherein the management unit determines change of the function as which the server operates so that a difference of operation statuses of the respective servers becomes small.

According to the invention, the management unit determines change of the function as which the server operates so that a difference of the operation statuses of the respective servers becomes small. Consequently, by causing the server to operate the function after the change, a difference of the operation statuses of the respective servers becomes small in the system, the operation statuses become stable, and performance degradation can be restricted.

(Supplementary Note 3)

The system according to Supplementary Note 2, wherein the management unit calculates an average of the operation statuses of all the servers, and determines change of the function as which the server operates so that the operation statuses of the respective servers become close to the average of the operation statuses.

By thus making the operation statuses of the respective servers close to the average of the operation statuses of all the servers, a difference of the operation statuses of the respective servers becomes small, the operation statuses become stable, and performance degradation can be restricted.

(Supplementary Note 4)

The system according to Supplementary Note 2 or 3, wherein the management unit calculates a first average representing an average of the operation statuses of all the servers and a second average representing an average of the operation statuses of the servers corresponding to each of the functions, and determines change of the function as which the server operates on a basis of the first average and the second average.

By thus using the result of calculation using the first average and the second average, it is possible to properly determine a function to change.

(Supplementary Note 5)

The system according to Supplementary Note 4, wherein so as to increase or decrease a number of the server operating as a given function, the management unit determines change of the given function as which the server operates, on a basis of a difference obtained by subtracting the first average from the second average for each of the functions.

By thus using a difference obtained by subtracting the first average from the second average, it is possible to easily determine a function in a sufficient status or a function in an insufficient status, and it is possible to properly change the functions.

(Supplementary Note 6)

The system according to Supplementary Note 5, wherein the management unit divides a product value by the first average for each of the functions, the product value being a value obtained by multiplying the difference by a number of the server operating as the function, and the management unit thereby calculates an increase or an decrease in a number of the server operating as a given function, and determines change of the function as which the server operates on a basis of the increase or the decrease.

By thus obtaining a difference by subtracting the first average from the second average and multiplying the difference by the first average, it is possible to calculate an increase or a decrease in the number of the servers to change the functions.

(Supplementary Note 7)

The system according to any of Supplementary Notes 1 to 6, wherein the operation status of the server is power consumption of the server.

(Supplementary Note 8)

The system according to any of Supplementary Notes 1 to 7, formed by one or a plurality of rack systems, each of the rack systems containing the plurality of servers.

(Supplementary Note 9)

The system according to any of Supplementary Notes 1 to 8, comprising a plurality of server groups, each of the server groups being composed of the plurality of servers, wherein the management unit determines change in arrangement of the functions between the server groups depending on the operation status of the server operating as the function after the determined change.

According to the invention, after the functions of the servers are once changed in the system, the arrangement of the functions is changed between the server groups depending on the operation statuses. Then, by causing the servers to operate as the function in the changed arrangement, it is possible to improve the operation statuses in the server groups. As a result, the operation statuses of the servers in the system become stable, and performance degradation can be restricted.

(Supplementary Note 10)

The system according to Supplementary Note 9, wherein the management unit determines change in arrangement of the functions between the server groups depending on an environment set for each of the server groups.

Thus, an appropriate operation status appropriate for an environment for each group is realized, the operation statuses of the servers become stable and performance degradation can be restricted.

(Supplementary Note 11)

The system according to Supplementary Note 9 or 10, wherein the management unit determines change of the functions as which the servers operate so that a number of changes in arrangement of the functions between the server groups is small.

Consequently, it is possible to reduce the number of the servers started as the changed functions, and it is possible to increase the speed of processing in changing the arrangement of the servers.

(Supplementary Note 12)

The system according to any of Supplementary Notes 9 to 11, wherein the management unit determines change of the functions as which the servers operate so that a difference of operation statuses in the respective server groups is small between the server groups.

Consequently, a difference of power consumption values becomes small between the server groups, so that the operation statuses become stable and performance degradation can be restricted.

(Supplementary Note 13)

A management device connected to a system including a plurality of servers, each of the servers being configured to operate as a given function of a plurality of functions, the server being able to operate as the functions, the management device comprising a microprocessor including:

a detection unit detecting an operation status of the server; and a management unit determining change of a function as which the server operates depending on the operation status.

(Supplementary Note 14)

A non-transitory computer-readable recording medium storing a program comprising instructions for causing a management device connected to a system including a plurality of servers each configured to operate as a given function of a plurality of functions as which the server can operate, to realize:

a detection unit detecting an operation status of the server; and a management unit determining change of a function as which the server is operates depending on the operation status.

(Supplementary Note 15)

A management method by a management device connected to a system including a plurality of servers, each of the servers being configured to operate as a given function of a plurality of functions, the server being able to operate as the functions, the management method comprising:

detecting an operation status of the server; and determining change of a function as which the server operates depending on the operation status.

(Supplementary Note 15.1)

The management method according to Supplementary Note 15, wherein the management device determines change of the function as which the server operates so that a difference of operation statuses of the respective servers becomes small.

(Supplementary Note 15.2)

The management method according to Supplementary note 15.1, wherein the management device calculates an overall average representing an average of the operation statuses of all the servers, and determines change of the function as which the server operates so that the operation statuses of the respective servers become close to the calculated overall average.

(Supplementary Note 15.3)

The management method according to any of Supplementary notes 15 to 15.2, wherein:

the system includes a plurality of server groups, each of the server groups being composed of the plurality of servers; and the management device determines change in arrangement of the functions between the server groups depending on the operation status of the server operating as the function after the determined change.

(Supplementary Note 15.4)

The management method according to Supplementary note 15.3, wherein the management device determines change of the functions as which the servers operate so that a number of changes in arrangement of the functions between the server groups is small.

(Supplementary Note 15.5)

The management method according to Supplementary Note 15.3 or 15.4, wherein the management device determines change of the functions as which the servers operate so that a difference of the operation statuses in the respective server groups is small between the server groups.

(Supplementary Note 2-1)

A system having a plurality of server groups each including a plurality of servers, each of the servers being configured to operate as a given function of a plurality of functions, the server being able to operate as the functions, the system comprising a microprocessor including:

a detection unit detecting operation statuses of the servers; and a management unit determining change in arrangement of the functions between the server groups depending on the operation statuses.

According to the invention, first, the detection unit detects the operation status of each of the servers. Then, the management unit determines change in arrangement of the functions between the server groups depending on the operation statuses. Consequently, the arrangement of the functions is changed between the server groups, and the operation statuses in the respective server groups can be improved. As a result, the operation statuses of the servers in the system becomes stable, and performance degradation can be restricted.

(Supplementary Note 2-2)

The system according to Supplementary Note 2-1, wherein the management unit determines change in arrangement of the functions between the server groups so that a number of the functions as which the servers operate is not changed in the whole system.

Consequently, by causing the servers to operate as functions after only the arrangement there of is changed without changing the existing system configuration, it is possible to improve the operation statuses in the respective server groups.

(Supplementary Note 2-3)

The system according to Supplementary Note 2-1 or 2-2, wherein the management unit determines change in arrangement of the functions between the server groups depending on an environment set for each of the server groups.

Thus, an appropriate operation status appropriate for an environment for each group is realized, the operation statuses of the servers become stable, and performance degradation can be restricted.

(Supplementary Note 2-4)

The system according to any of Supplementary Notes 2-1 to 2-3, wherein the management unit determines change of the functions as which the servers operate so that a number of changes in arrangement of the functions between the server groups is small.

Consequently, it is possible to reduce the number of the servers started as the changed functions, and it is possible to increase the speed of processing in changing the arrangement of the servers.

(Supplementary Note 2-5)

The system according to any of Supplementary Notes 2-1 to 2-4, wherein the management unit determines change of the functions as which the servers operate so that a difference of the operation statuses in the respective server groups is small between the server groups.

Consequently, a difference of power consumption values becomes small between the server groups, so that the operation statuses become stable and performance degradation can be restricted.

(Supplementary Note 2-6)

The system according to any of Supplementary Notes 2-1 to 2-5, wherein the operation status of the server is power consumption of the server.

(Supplementary Note 2-7)

The system according to any of Supplementary Notes 2-1 to 2-6, wherein the server groups are each formed by a rack system containing the plurality of servers.

(Supplementary Note 2-8)

A management device connected to a system composed of a plurality of server groups each including a plurality of servers each configured to operate as a given function of a plurality of functions as which the server can operate, the management device comprising a microprocessor including:

a detection unit detecting operation statuses of the servers; and a management unit determining change in arrangement of the functions between the server groups depending on the operation statuses.

(Supplementary Note 2-9)

A non-transitory computer-readable recording medium storing a program comprising instructions for causing a management device connected to a system composed of a plurality of server groups each including a plurality of servers each configured to operate as a given function of a plurality of functions as which the server can operate, to realize:

a detection unit detecting operation statuses of the servers; and a management unit determining change in arrangement of the functions between the server groups depending on the operation statuses.

(Supplementary Note 2-10)

A management method by a management device connected to a system composed of a plurality of server groups each including a plurality of servers, each of the servers being configured to operate as a given function of a plurality of functions, the server being able to operate as the functions, the management method comprising:

detecting operation statuses of the servers; and determining change in arrangement of the functions between the server groups depending on the operation statuses.

(Supplementary Note 2-11)

The management method according to Supplementary Note 2-10, wherein the management device determines change in arrangement of the functions between the server groups so that a number of the functions as which the servers operate is not changed in the whole system.

(Supplementary Note 2-12)

The management method according to Supplementary Note 2-10 or 2-11, wherein the management device determines change in arrangement of the functions between the server groups depending on an environment set for each of the server groups.

(Supplementary Note 2-13)

The management method according to any of Supplementary Notes 2-10 to 2-12, wherein the management device determines change of the functions as which the servers operate so that a number of changes in arrangement of the functions between the server groups is small.

(Supplementary Note 2-14)

The management method according to any of Supplementary Notes 2-10 to 2-13, wherein the management device determines change of the functions as which the servers operate so that a difference of the operation statuses in the respective server groups is small between the server groups.

The abovementioned program is stored in a storage device or recorded on a computer-readable recording medium. For example, the recording medium is a portable medium such as a flexible disk, an optical disk, a magneto-optical disk, and a semiconductor memory.

Although the present invention has been described above referring to the exemplary embodiments and so on, the present invention is not limited to the exemplary embodiments described above. The configurations and details of the present invention can be changed and modified in various manners that can be understood by one skilled in the art within the scope of the present invention.

The invention claimed is:

1. A system including a plurality of servers, each of the servers being configured to operate as a given function of a plurality of functions, each server being able to operate as the functions, the system comprising a microprocessor including:
a detection unit detecting an operation status of a first server of the plurality of servers; and
a management unit determining change of a function as which the first server operates depending on the operation status,
wherein the management unit calculates an average of the operation statuses of all of the plurality of the servers, and determines change of the function as which the first server operates so that the operation status of each of the respective servers of the plurality of servers become close to the average of the operation statuses.

2. The system according to claim 1, wherein the management unit determines change of the function as which the first server operates so that a difference of operation statuses of the respective servers of the plurality of servers becomes small.

3. The system according to claim 2, wherein the management unit calculates a first average representing an average of the operation statuses of all the servers and a second average representing an average of the operation statuses of the servers corresponding to each of the functions, and determines change of the function as which the first server operates on a basis of the first average and the second average.

4. The system according to claim 3, wherein so as to increase or decrease a number of servers operating as a given function, the management unit determines change of the function as which the first server operates, on a basis of a difference obtained by subtracting the first average from the second average for each of the functions.

5. The system according to claim 4, wherein the management unit divides a product value by the first average for each of the functions, the product value being a value obtained by multiplying the difference by a number of servers operating as the function, and the management unit thereby calculates an increase or an decrease in a number of servers operating as a given function, and determines change of the function as which the first server operates on a basis of the increase or the decrease.

6. The system according to claim 1, wherein the operation status of the first server is power consumption of the first server.

7. The system according to claim 1, formed by one or a plurality of rack systems, each of the rack systems containing the plurality of servers.

8. A system including a plurality of servers, each of the servers being configured to operate as a given function of a plurality of functions, each server being able to operate as the functions, the system comprising a microprocessor including:
a detection unit detecting an operation status of a first server of the plurality of servers; and a management unit determining change of a function as which the first server operates depending on the operation status;

the system further comprising a plurality of server groups, each of the server groups being composed of the plurality of servers, wherein the management unit determines change in arrangement of the functions between the server groups depending on the operation status of the first server operating as the function after the determined change.

9. The system according to claim 8, wherein the management unit determines change in arrangement of the functions between the server groups depending on an environment set for each of the server groups.

10. The system according to claim 8, wherein the management unit determines change of the functions as which the servers operate so that a number of changes in arrangement of the functions between the server groups is small.

11. The system according to claim 8, wherein the management unit determines change of the functions as which the servers operate so that a difference of operation statuses in the respective server groups is small between the server groups.

12. A system including a plurality of servers, each of the servers being configured to operate as a given function of a plurality of functions, each server being able to operate as the functions, the system comprising a microprocessor including:

a detection unit detecting an operation status of a first server of the plurality of servers; and a management unit determining change of a function as which the first server operates depending on the operation status;

the system further comprising a plurality of server groups, each of the server groups being composed of the plurality of servers, wherein the management unit determines change an arrangement of the functions between the server groups depending on the operation status.

13. The system according to claim 12, wherein the management unit determines change in arrangement of the functions between the server groups so that a number of the functions as which the servers operate is not changed in the whole system.

14. The system according to claim 12, wherein the management unit determines change in arrangement of the functions between the server groups depending on an environment set for each of the server groups.

15. The system according to claim 12, wherein the management unit determines change of the functions as which the servers operate so that a number of changes in arrangement of the functions between the server groups is small.

16. The system according to claim 12, wherein the management unit determines change in arrangement of the functions as which the servers operate so that a difference of operation statuses in the respective server groups is small between the server groups.

17. The system according to claim 12, wherein the operation status of the first server is power consumption of the first server.

18. The system according to claim 12, wherein the server groups are each formed by a rack system containing the plurality of servers.

19. A management method by a management device connected to a system including a plurality of servers, each of the servers being configured to operate as a given function of a plurality of functions, each server being able to operate as the functions, the system further comprising a plurality of server groups, each of the server groups being composed of the plurality of servers, the management method comprising:

detecting an operation status of a first server of the plurality of servers;

determining change of a function as which the first server operates depending on the operation status, and determining change of an arrangement of the functions between the server groups depending on the operation status.

20. The management method according to claim 19, wherein:

the management device is connected to a system including a plurality of server groups each composed of the plurality of servers; and the management unit determines change in arrangement of the functions between the server groups depending on the operation status.

* * * * *